United States Patent
Janzig et al.

(10) Patent No.: US 7,032,211 B1
(45) Date of Patent: Apr. 18, 2006

(54) METHOD FOR MANAGING USER SCRIPTS UTILIZING A COMPONENT OBJECT MODEL OBJECT (COM)

(75) Inventors: Richard Charles Janzig, Mission Viejo, CA (US); David George Maw, Rancho Santa Margarita, CA (US); Patricia Lynn Maw, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 649 days.

(21) Appl. No.: 10/197,543

(22) Filed: Jul. 16, 2002

(51) Int. Cl.
*G06F 9/44* (2006.01)

(52) U.S. Cl. ...................... 717/120; 717/115

(58) Field of Classification Search ............... 709/320, 709/219, 223; 717/120, 115; 714/4, 38; 702/182
See application file for complete search history.

(56) References Cited

U.S. PATENT DOCUMENTS

| | | | |
|---|---|---|---|
| 5,875,290 A | 2/1999 | Bartfai et al. | |
| 5,974,569 A | 10/1999 | Nickles | |
| 6,035,264 A | 3/2000 | Donaldson et al. | |
| 6,044,398 A | 3/2000 | Marullo et al. | |
| 6,571,285 B1 * | 5/2003 | Groath et al. ............... | 709/223 |

OTHER PUBLICATIONS

"Unix Manual (man) pages in HML", http://web.archive.org/web/20010602151524/www.rt.com/man/.*

* cited by examiner

*Primary Examiner*—Tuan Dam
*Assistant Examiner*—Chih-Ching Chow
(74) *Attorney, Agent, or Firm*—Alfred W. Kozak; Mark T. Starr; Lise A. Rode

(57) ABSTRACT

The method of the present invention is useful in managing scripts easily, by providing a scriptable interface that allows the registering and managing of scripts. The program executes a method for registering a script with a ScriptUtility, and involves a method for utilizing the steps of waiting on events, sleeping without displaying a message, and setting a time interval and periodically receiving OnInterval events.

10 Claims, 7 Drawing Sheets

Utility Script A

Utility Script A

REGISTER SCRIPT

INTERVAL HANDLER

INTERVAL

SCRIPT SLEEPS

SCRIPT SLEEPS

UNREGISTER SCRIPT

METHOD FOR MANAGING USER SCRIPTS UTILIZING A COMPONENT OBJECT MODEL OBJECT (COM)

FIELD OF THE INVENTION

The present invention generally relates to a set of capabilities and features that will simplify the management of running scripts, and in particular to allow a system to create scheduled tasks, and to permit scripts running outside the control of a specific script management tool to be manipulated from scripts under the tool's control.

CROSS REFERENCE TO RELATED APPLICATIONS

This application is related to co-pending application U.S. Ser. No. 10/196,996 entitled "Servicing Method for Script Monitor COM Object" which is incorporated herein by reference.

BACKGROUND OF THE INVENTION

There are several ways to run scripts today, specifically using Windows Script Host, and Scheduled Tasks Facility. These tools allow one to initiate scripts, and enable one to schedule scripts for later execution or for repeated execution. There is, however, an easier way to manage scripts using a scriptable interface that allows one to register and manage scripts.

One way in which this feature has been incorporated is through registering scripts through what is referred to as a Script Utility. Script Utility is generally defined as allowing a registered script to wait on events, sleep without displaying a message, setting a time interval and periodically receiving OnInterval events.

In order to ensure high availability and proper performance of a system, it is useful to monitor various aspects of the system to detect and respond to problems as quickly as possible. In the Windows operating system environment, for example, scripts are frequently used for this purpose because they provide a simple deployment method for a reproducible and easily modifiable sequence of detection and response statements. At the current time, there is no unobtrusive way to keep a script running and responsive using the most popular scripting language in the Windows operating system environment (vbscript).

The present invention was created to simplify the management of running scripts. A method of the invention combines the best features of the vbscript MsgBox and Sleep constructs. Therefore, a script can create one or more ScriptUtility objects. There is a sleep method that supports the displaying of a message box on the user's desktop. The visibility of the display, however, is entirely under the user's control. In turn, the user is able to specify whether the message box should be completely invisible or not through the scriptable interface to the ScriptUtility object. In effect, the user can decide to alter the setting of the script to be visible in certain circumstances, and invisible under others. If the display is visible, the user can choose to minimize it using standard keyboard or mouse controls so that it appears only on the task bar at the bottom of the desktop rather than on the desktop itself. This feature is useful in any script that previously used a standard vbscript MsgBox statement.

Unlike other sleep methods, the ScriptUtility sleep is not time bounded. Therefore, if a script wishes to sleep, it must first call the ScriptUtility Register method to register the script with the ScriptMonitor service. An OnInterval event allows the script to perform scripted tasks at regular intervals, regardless of whether the script is also sleeping. This feature provides a facility for performing elapsed time processing at regular intervals that was not previously available to scripts without the use of a loop containing a Sleep statement.

One prior art method to which the method of the present invention generally relates is described in U.S. Pat. No. 6,044,398 entitled "Virtual Dynamic Browsing System and Method for Automated Web Server and Testing." This prior art method is an Internet website virtual browser application which automatically exercises and verifies web server applications and scripts by simulating a web browser to request, capture, store, and verify data returned from web servers, discarding data not critical to testing, and saving and reusing retained data for subsequent transactions. Input and links are accepted, from a GUI edit field or input data file, with posts and gets supported to return pages and other requested data, then saved in user-specified files for verification. GUI edit field options may override server/port definitions without changing input data files and may provide for user-specified termination after a specified number of errors, specifying number of retries and level-setting of messaging for log files and screens. A log file stores the request and byte count total bytes transferred, time of transaction, throughput or transfer time, and the result of compares. The verify option automatically compares previously received and current request data. A smart pass/fail status derives a total pass/fail count for all requested pages. Input data may be looped for reliability testing. Critical requests may be labeled and required to be successful; and sleep values between requests are user-specifiable to simulate actual users and test session timeouts.

The present invention differs from the above prior cited art in that the prior invention focuses on testing, not general use. The "sleep" mentioned in this prior invention appears as if it is for a non-interruptible interval, and the script being executed only interacts with a web page and does not allow the entire range of windows scripting commands, as is possible in the present invention.

Another prior art method to which the method of the present invention generally relates is detailed in U.S. Pat. No. 5,974,569 entitled "System and Method for Determining Whether Time-based Operations of a Computer System Operate Properly." This prior art method is a method for identifying whether time-based operations of a computer system operate properly for time intervals over which the computer system operates. Specifically, this prior art invention is operative to identify the type of failure that occurs. It utilizes test programs and test procedures to determine whether the hardware, BIOS, operating system, and computer language handle time and date calculations correctly. This prior art may identify a time period to be evaluated and divide the time period into a plurality of time intervals. Then a process accepts a first frequency value that specifies the frequency at which time test modules are to execute the time-based operations of the computer system. A first set of time-based test modules are executed at the occurrence-frequency specified by the first frequency value in a first time interval. A second occurrence-frequency value may be specified and the time test modules are executed at the occurrence-frequency specified by a second frequency value. The time test modules may be executed for a second time interval at the frequency specified by the second frequency value.

The present invention differs from this prior art in that the cited prior art deals with a sleep module that only seems to be concerned with the accuracy of a system clock during a system "sleep" operator. Also, this prior art is not scriptable and is not applicable to general use.

Yet another prior art method to which the method of the present invention generally relates is detailed in U.S. Pat. No. 6,035,264 entitled "Electronic Control System and Method for Externally Controlling Process in a Computer System With a Script Language." This prior art method is an electronic control method for externally controlling processes in a computer system and provides electronic data, which is presented as graphical information to a user on a display device. In addition, electronic data input by the user is received. Software routines are written in a script language specifically designed for computer monitoring and control operations through interactively presenting data to and receiving data from the user. Subsequently, processing rules are interpreted from the software routines with an electronic data processor. Operations of the computer system are controlled based on the processing rules with the electronic data processor such that the computer system can be automatically controlled externally with the processing rules by only utilizing preexisting computer system signals received from the computer system and control signals sent to the computer system. In addition, a control system for implementing the external control method is provided.

This prior art differs from the present invention in that the prior invention seems to simply be a method for running a script. However, this prior invention does not address keeping a user's script active in an inconspicuous manner, or letting a user resume execution of a sleeping script at will, or letting users manage sleeping scripts from a centralized interface or GUI.

SUMMARY OF THE INVENTION

It is therefore an object of the present invention to allow scripts to register with the Script Utility.

Still another object of the present invention is allowing scripts, that wait on events, to sleep indefinitely without having to display a message box, but can still be made visible and identifiable to interested parties.

Still another object of the present invention is to allow scripts to be set for a time interval and to receive OnInterval events periodically.

Still another object of the present invention is to allow scripts or programs to monitor and manage the registered scripts so that registered scripts can be enumerated, and sleeping scripts can be awakened.

Still another object of the present invention is to offer access to the Microsoft Task Scheduler so that a script can be scheduled to run on a regular basis, independent of the Script Utility client, started independently from the Script Utility client, and terminated independently of the Script Utility client.

The method of the present invention is to ensure high availability and proper performance of a system, where, it is useful to monitor various aspects of the system to detect and respond to problems as quickly as possible.

In the present invention, useful scripts are registered, the OnInterval setting is made to automatically trigger a relevant script by setting the interval timer, whereby the relevant script can awaken and execute its function after which it is put to "sleep". Additionally, a registered script can be removed from registry by an "unregister script" process.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

Figure 1:
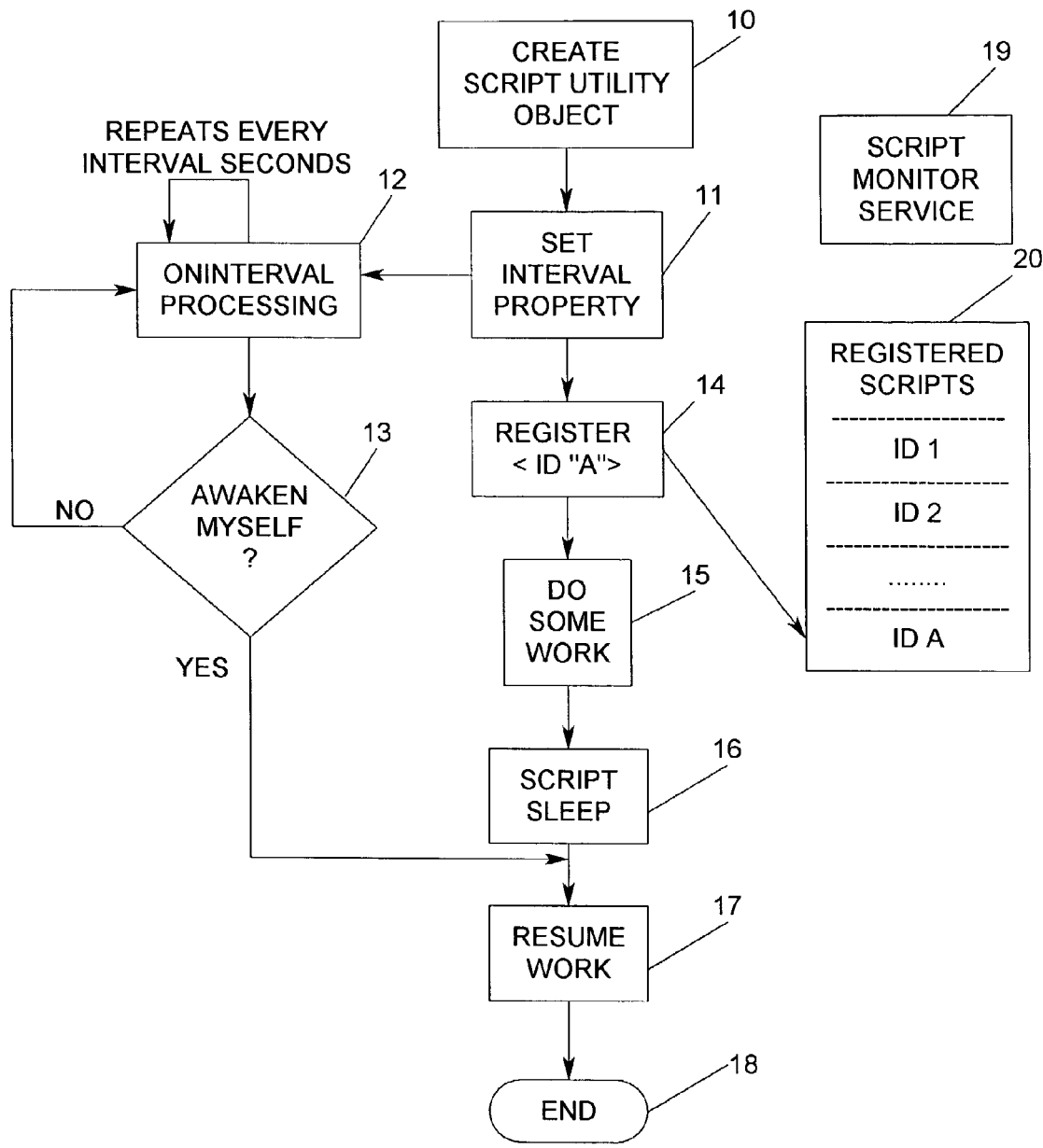
FIG. 1 is a generalized diagram of a system that holds registered scripts that can be awakened after a preset interval to execute a desired process and then put back to sleep.

1. Script: A script is a set of instructions that automate the operation of an application or utility program. The instructions usually use the rules and syntax of the application and utility program.

2. COM (Component Object Model) Object: A component written to the COM standard that provides interfaces which can be invoked by applications. This is a specification developed by Microsoft for building a software component that can be assembled into programs or to add functionality to existing programs running on Microsoft platforms.

3. Sentinel: A software suite sold with the Unisys ES7000 group and ClearPath Plus servers to provide platform management capabilities.

4. Server Director (scripts): Scripts written in the Server Director scripting language to run in the Server Director application environment. Server Director is a product that is sold at Unisys, based on the NetIQ AppManager. It hosts and provides a graphical user interface for deploying scripts and monitoring their results.

5. Windows Script Host (WSH): A Microsoft application that hosts library modules capable of processing various kinds of scripts. Provides access to Windows resources.

6. Scheduled Tasks Facility (see Glossary # 23—Microsoft Task Scheduler): Can be used to initiate scripts at preselected times. The task scheduler service is automatically installed with the Microsoft Windows operating system.

7. Script Utility: A set of CON objects that make managing scripts easier by providing a scriptable interface that enables you to register and manage scripts. "Script Utility" (with space) is the name given to all of these features implemented in two separate COM objects "ScriptUtility" (no space) and "ScriptMonitor".

8. ScriptUtility callback method waittimer (FIG. 3): Windows callback used to associate the script statements in the OnInterval block of a script with expiration of the Interval timer. The callback is a windows mechanism for hooking up the expiration of the timer to the invocation of the OnInterval block. This mechanism is not viewable, it happens in the core of the operating system.

9. OnInterval Event: An event that is fired by a ScriptUtility object at a certain regular time period specified by the object's Interval property. The OnInterval event allows a script to be awakened periodically. An event will be caused each time the number of seconds specified by the interval property elapses after the Interval property has been set to a value greater than zero (0). (Also described in Glossary #34). "OnInterval" is an event associated with a particular ScriptUtility instance, provided automatically by the Windows operating system. (Also see Glossary Item #37).

10. VBScript: Microsoft's scripting language, which is an extension of their Visual Basic language. VBScript can be used with Microsoft applications and others. It can also be embedded in web pages processed by Internet Explorer.

11. Msg Box (Message Box): A VBScript function that displays a descriptive message in a dialog box, waits for the user to click a button, and returns a value indicating which button the user clicked.

12. ScriptUtility Object: A COM object that supports Sleep, Awaken, and Register methods, Interval, Visible, Description, and MsgString properties, and an OnInterval event. A ScriptUtility object is created by invoking the CreateObject method provided by Microsoft, in this case from within a script, e.g:
   Set objUtil=WScript.CreateObject("Unisys.ScriptUtility")

"Script utility object" and "ScriptUtility object" are synonyms for a single instance of the ScriptUtility COM class instantiated by a script or program.

13. Sleep method (WSH—Windows Script Host): A method that suspends script execution for a specified length of time and then continues.

14. Task bar: The bar that contains the Start button and buttons representing other running programs that appears by default at the bottom of a Windows screen.

15. Standard VBScript MsgBox (statement): A statement used to display a descriptive message. See "MsgBox" (above, Glossary #11).

16. ScriptUtility Register Method: This method enables a script to be included in the list of registered scripts for ScriptMonitor object. Including a script in the registered script list provides external control for the lifetime of the script. A script can call the Register method only one time during its execution. If a script has instantiated more than one ScriptUtility object, it can use only one of the objects to register the script.

17. ScriptMonitor Service: "ScriptMonitor" (without space) is the same thing as "Script Monitor Service". A component within the Script Utility set that enables you to monitor and manage scripts that are registered with ScriptUtility. This is the console interface within Script Utility that enables you to list registered scripts and awaken a sleeping script. Awaken implies that registered scripts can be accessed and executed. "Script Monitor" and "Script Monitor service" are synonyms for the Windows service provided as part of this feature. The Script Monitor service is created and run by the Windows installer when the Unisys Platform Tools product is installed on a licensed Unisys server.

18. Scripted Tasks: Tasks that have been automated by, and can be utilized by accessing and executing them using a script.

19. Elapsed time processing: Execution of script statements at regular time intervals, as specified by an object's "Interval property" in a ScriptUtility object. See Glossary #9.

20. Loop containing Sleep statement: Method of keeping a script active by performing a VBScript Sleep statement inside a loop.

21. Enumerating registered scripts: The ability to select one or more scripts registered with the ScriptMonitor service based on their file name, account (user) name, or the user-settable description registered with the script.

22. Registered Scripts: Scripts that have been made known to the ScriptMonitor service using the ScriptUtility object's Register method. "Register" is another method the code provides for scripts to use if they want to:

Set ObjUtil=WScript.CreateObject("Unisys.ScriptUtility", "MyEvent_") objUtil.Register <process ID>, <description>

23. Microsoft Task Scheduler: The Microsoft Task Scheduler is a tool that (in most cases) comes already with your Windows installation and "hides" in the "Control Panel" folder that is located in the "My Computer" folder on your desktop. By using Task Scheduler, you can schedule tasks to run at a time that is most convenient for you. Task Scheduler starts each time you start Windows, and runs in the background. With Task Scheduler, you can: Schedule a task to run daily, weekly, monthly, or at certain times (such as system startup). This also relates to Glossary #6.

24. Script Utility Client: A program that uses the Script Utility. Defined in Glossary #7.

25. Do "work" (FIG. 1, block 15, 17): Perform one or more script statements. Doing "work" means the script does whatever task it was coded to do. For example, it can perform the tasks of displaying messages, create and use scriptable objects, copy files, etc.

26. Sleep process/Script sleeps: Process of causing a registered script to wait until awakened. The user can control whether the script is visible on the desktop while sleeping by setting the ScriptUtility Visible property. If visible, the user can also control what information is displayed by the sleeping script through the Description and MsgString properties. The script can be awakened through the ScriptMonitor service or the displayed dialog box (if visible).

27. Registration Handle (FIG. 2, block 31): A unique identifier generated by the ScriptMonitor service for each script registered with it.

28. Script Name: Simple name of script, such as "myscript.vbs"

29. File Name: Full path and name of script, such as "C:\Scripts\myscript.vbs".

30. ISCRIPTREGISTER interface (FIG. 2 block 34): COM interface implemented by the ScriptMonitor object to support registration of scripts.

31. ScriptMonitor Service (FIG. 2 block 34): A component within the Script Utility set that enables you to monitor and manage scripts that are registered with ScriptUtility. This is the console interface within Script Utility that enables you to list registered scripts and awaken a sleeping script.

32. Interval handler (FIG. 3): Process of creating and starting a timer which is associated with a ScriptUtility object and which will expire periodically. Expiration of the timer causes the script statements associated with the OnInterval event to be executed. The timer expires according to the setting of the interval property, which could be any number of seconds, or even never if the interval is set to zero. "Timed" scripts are not tracked by this feature (unlike registered scripts). They are just scripts in which the user has chosen to use an instance of the ScriptUtility class with a value specified for its Interval attributed (thus, the user has "selected" that script to perform this behavior).

33. Expiration interval: Time interval to elapse between expirations of the OnInterval event, specified by the Interval property of the ScriptUtility object.

34. Interval property (of ScriptUtility Object) (FIG. 3, #42): Time period to elapse before the interval timer expires. Must be set to a number greater than zero in order for the timer to begin running. The Interval property for a ScriptUtility object is likewise created by script syntax that invokes the code:

Set ObjUtil=WScript.CreateObject("Unisys.ScriptUtility", "MyEvent_")

objUtil.Interval=5 'tells Windows to fire an event called OnInterval every 5 seconds Sub MyEvent_OnInterval( )

'Gets executed every ObjUtil.Interval seconds

<do stuff>

35. New Interval Timer (FIG. 3, #44): Timer associated with a ScriptUtility object that will expire periodically. Expiration of the timer causes the script statements associated with the OnInterval event to be executed.

36. Expired timer (FIG. 4, #52): OnInterval timer whose Interval period has elapsed, causing the timer to cancel.

37. OnInterval processing: One or more script statements associated with the ScriptUtility OnInterval event. Essentially, a script goes through the process of setting the number of the Interval property to greater than zero, which in turn, fires the OnInterval event for the first time after the number of seconds specified by the Interval property has elapsed. When the OnInterval handler completes, the timer is reset and the OnInterval event fires again when the number of seconds specified by the Interval property has again elapsed.

38. Object not sleeping?: A script that is already sleeping cannot invoke the Sleep method again until it has been awakened.

39. CSNOOZEDLG object (FIG. 5A): Internal object used to create the dialog box displayed by a sleeping script. "CSNOOZEDLG object" is an instance of a class defined within the ScriptUtility class that provides an invisible dialog box that keeps the script active in the mix while it is "sleeping". The dialog box may or may not be visible on the desktop. See Glossary #42 to determine visibility or invisibility.

40. Description property (FIG. 5A #63 and FIG. 6 #90): The string entered for the Description parameter to the ScriptUtility Register method. Also see Glossary #16.

41. MsgString property (FIG. 5A): A string property of the ScriptUtility object that defines a message to display when the ScriptUtility Sleep method is invoked, as indicated in Glossary #13.

42. Visible property (FIG. 5A): A Boolean property of the ScriptUtility object that controls the display of a message when the Sleep method is invoked. If this property is True, the message is displayed. If False, the message is not visible on the desktop.

43. Modeless dialog box (FIG. 5A): A dialog box whose display does not prevent interaction with the parent program.

44. WM quit message (FIG. 5B): Windows message used to terminate a program that responds to mouse clicks.

45. Message pump (FIG. 5A): Windows term for code that performs a loop to read messages from a queue and dispatch them to the appropriate subroutine for processing. The messages are most often related to the display of the user interface associated with the program.

46. Awaken type (FIG. 5B #72): Value returned when continuing a sleeping script: either vbOK (1) or vbCancel (2).

47. Unregister method (FIG. 5B #74): ScriptUtility object method used to notify the ScriptMonitor service that a registered script should no longer be monitored by the service.

Figure 6:
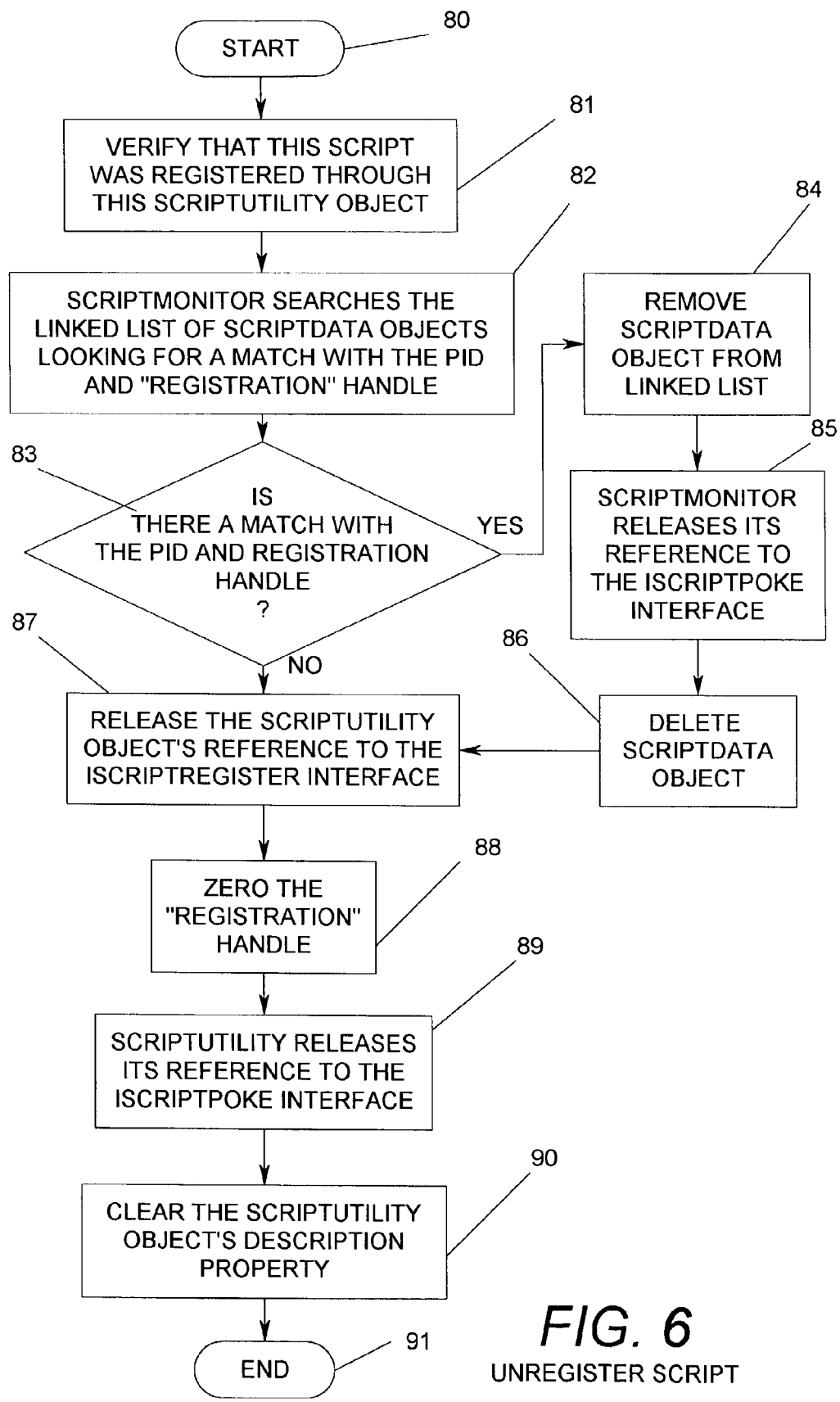
FIG. 6 is a flowchart that illustrates the process of unregistering a script that had already been registered.

48. Unregister script (FIG. 6): Process of notifying the ScriptMonitor service that a script should no longer be monitored. The UNREGISTER process is shown in FIG. 6 ("Unregister Script"). It is described in the text at steps 80–91. "Unregister" is mostly just cleaning-up after ourselves. The information was included to clarify what happens to our classes throughout their entire life cycle.

49. ScriptMonitor (FIG. 6): See "ScriptMonitor Service", above, at Glossary #17.

50. Scriptdata objects (FIG. 6): Internal objects used by the ScriptMonitor to contain data about registered scripts.

51. PID: This property returns the process identifier for a script. The process identifier is a number unique across the system.

52. ISCRIPTPOKE interface (FIG. 6, #25): CON interface implemented by the ScriptUtility object to support remote invocation of the Awaken method. When the ScriptMonitor object calls its awaken method on a script that has been registered with the Script Monitor service, that is a remote invocation of awaken. "ISCRIPTPOKE" and "ISCRIPTREGISTER" are CON interfaces used for communications between ScriptUtility and ScriptMonitor objects.

53. Sleep method (ScriptUtility): This method enables a script to sleep while waiting on other events without creating a message box to prevent itself from exiting. In a multiprocessing environment, a temporary state of suspension during which a process remains in memory, so that some event, such as an interrupt or call from another process, can "awaken" it, sleep implies to suspend operation without terminating the function.

54. Utility Program: A program designed to perform maintenance work on a system or system components. For example: a storage backup program, a disk and file recovery program, or a resource editor.

55. Object: In object oriented programming, a variable comprising both routines and data that is treated as a discrete entity.

56. Managing a script: In general, managing a script means running a particular script at an appropriate time on an appropriate system ("appropriate" as defined by the management policy set up by the user) and tracking its execution once run.

DESCRIPTION OF PREFERRED EMBODIMENT

Referring now to the drawings and FIG. 1 in particular, a generalized block diagram is shown of how the utility script operates. The diagram begins with the process creating a script utility object (block 10), which then sets the interval property (block 11). From there, it can go in one of two directions. It can go into OnInterval processing (block 12), which repeats every interval seconds and loops back to it. It then asks if it should "awaken" itself (Diamond 13). If the answer to this is yes, it skips out of the loop and returns to the main process and resumes work (block 17), which then proceeds to end (bubble 18). If the answer to the inquiry at step 13 is no, it loops back to OnInterval processing (block 12), and continues to loop through itself.

After the process of setting the interval property at step 11, a process is initiated to register the script (block 14), such as ID "A". Once it registers a script, the script is stored in an array of registered scripts (block 20). Then some processing work is done (block 15), which leads to the condition of a script sleeping (block 16). After the sleep process, the script awakens and resumes processing work (block 17). It then proceeds to end (bubble 18).

Figure 2:
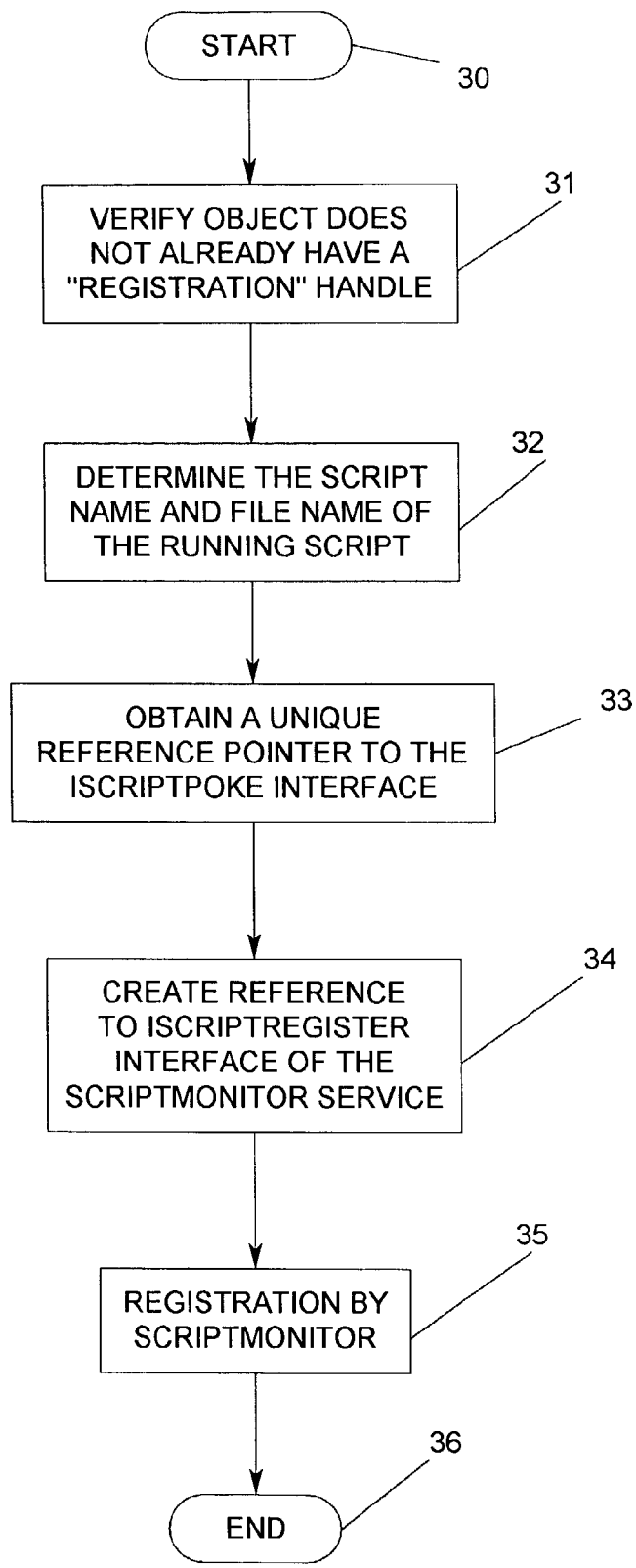
FIG. 2 is a flowchart illustrating the steps of script registration for holding data in a script monitor.

FIG. 2 is a high-level flowchart that describes the process of registering a script. The register script process begins with start bubble 30 followed by a process step (block 31) to verify that a script utility object does not already have a "Registration" handle. The process continues with another process step (block 32), which determines the script name and file name of the running script. The process continues with another process step (block 33), which obtains a unique reference pointer to the ISCRIPTPOKE interface, which is used to support invocation of a Script Awaken method when desired. The process continues with another process step (block 34), which creates reference to the ISCRIPTREGISTER interface of the ScriptMonitor service to support script registration. The process continues with another process step (block 35), which performs registration by the ScriptMonitor. The process then exits (bubble 36). As a result, one or more scripts have been filed for later access and execution.

Figure 3:
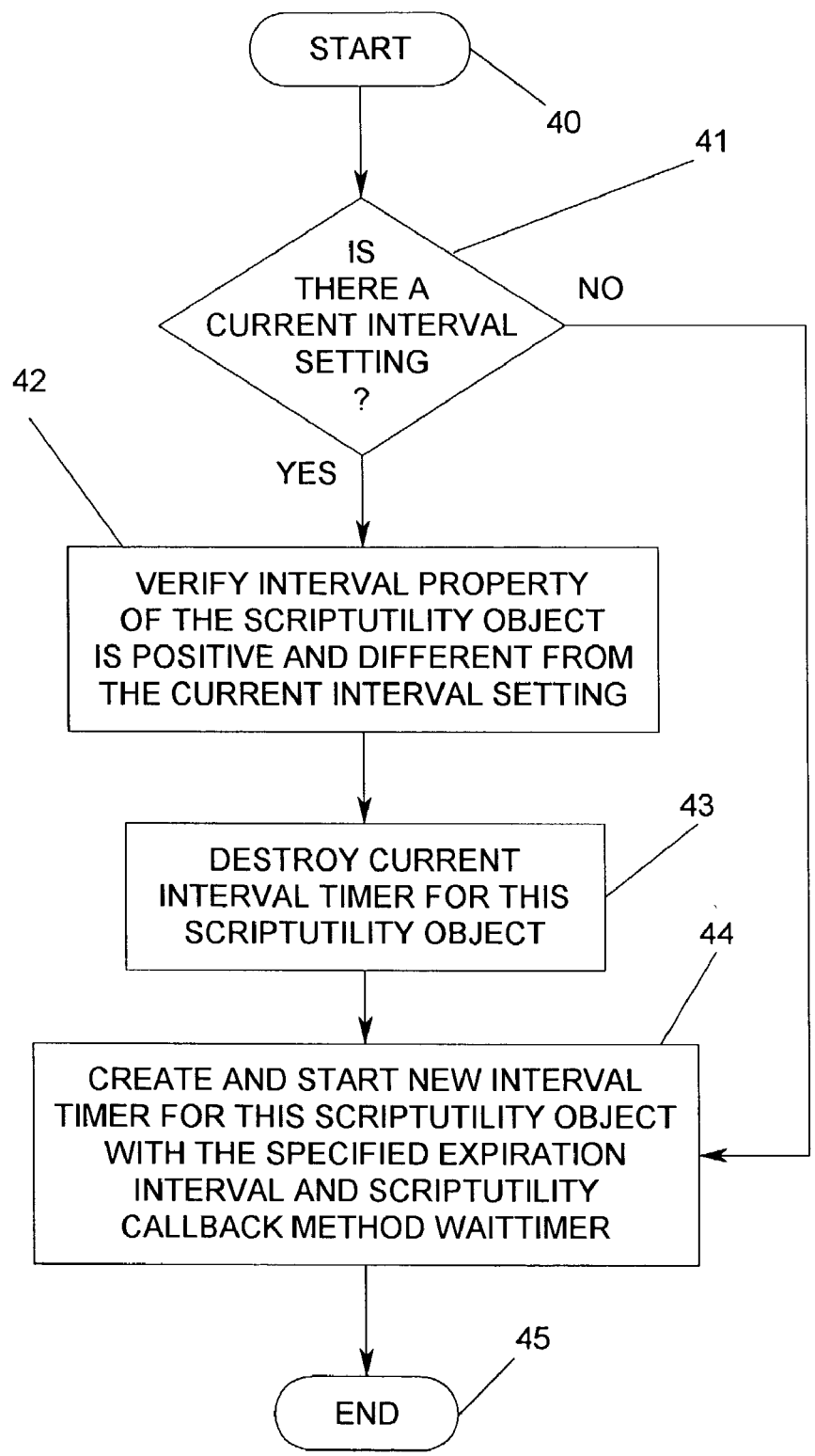
FIG. 3 is a flowchart illustrating the steps for an interval handler to set the time for triggering a script on and then off.

Now referring to FIG. 3, a flowchart that illustrates the steps for the interval handler is shown. This will enable the system to automatically perform a desired sequence of statements after a preset time interval. The process begins with a ScriptUtility object with start bubble 40 followed by an inquiry as to whether or not there is a current interval setting (diamond 41). If the answer to this inquiry is no, the process creates and starts a new interval timer at step 44 for this ScriptUtility object with the specified expiration interval and ScriptUtility callback method waittimer (block 44), which then exits (bubble 45). If the answer to this inquiry (diamond 41) is yes, the process continues with a process to verify the interval property of the ScriptUtility object as being positive and different from the current interval setting (block 42). The process continues with another process step (block 43), which destroys the current interval timer for this ScriptUtility object. The process then continues with step 44 that creates and starts a new interval timer for this ScriptUtility object with the specified expiration interval and invokes a ScriptUtility callback method waittimer (block 44), which associates the script with a particular expiration time. The process then exits (bubble 45). As a result, this ScriptUtility Object is given a new interval timer with a specified expiration time.

Figure 4:
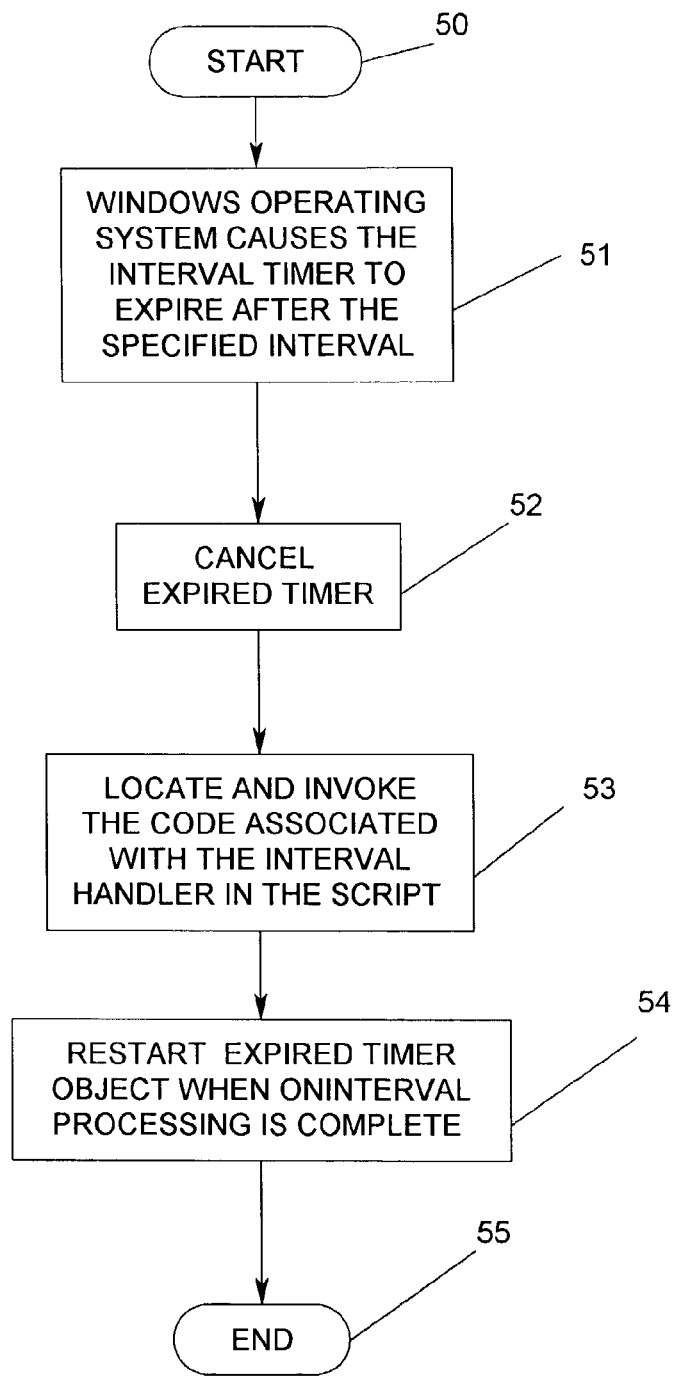
FIG. 4 is a flowchart that illustrates the steps for interval processing, where the trigger time has expired and a restart of a new interval is set.

Referring to FIG. 4, a high-level flowchart for interval processing is shown. The purpose of interval processing is essentially to set a time interval in order to receive OnInterval events periodically. Once the OnInterval processing is complete, the timer is restarted, and Interval processing is a success. The process begins with start bubble 50 followed by a process step (block 51) where Windows operating system causes the interval timer to expire after the specified interval. The process then cancels the expired timer for this ScriptUtility object (block 52). The process then continues with another process block (block 53) to locate and invoke the code associated with the interval handler in the selected script. The process then continues with another process that restarts the expired timer when OnInterval processing is complete (block 54). The process then exits (bubble 55). Thus the expiration of the interval timer will cause the script statements associated with the OnInterval Event to be executed.

Figure 5A:
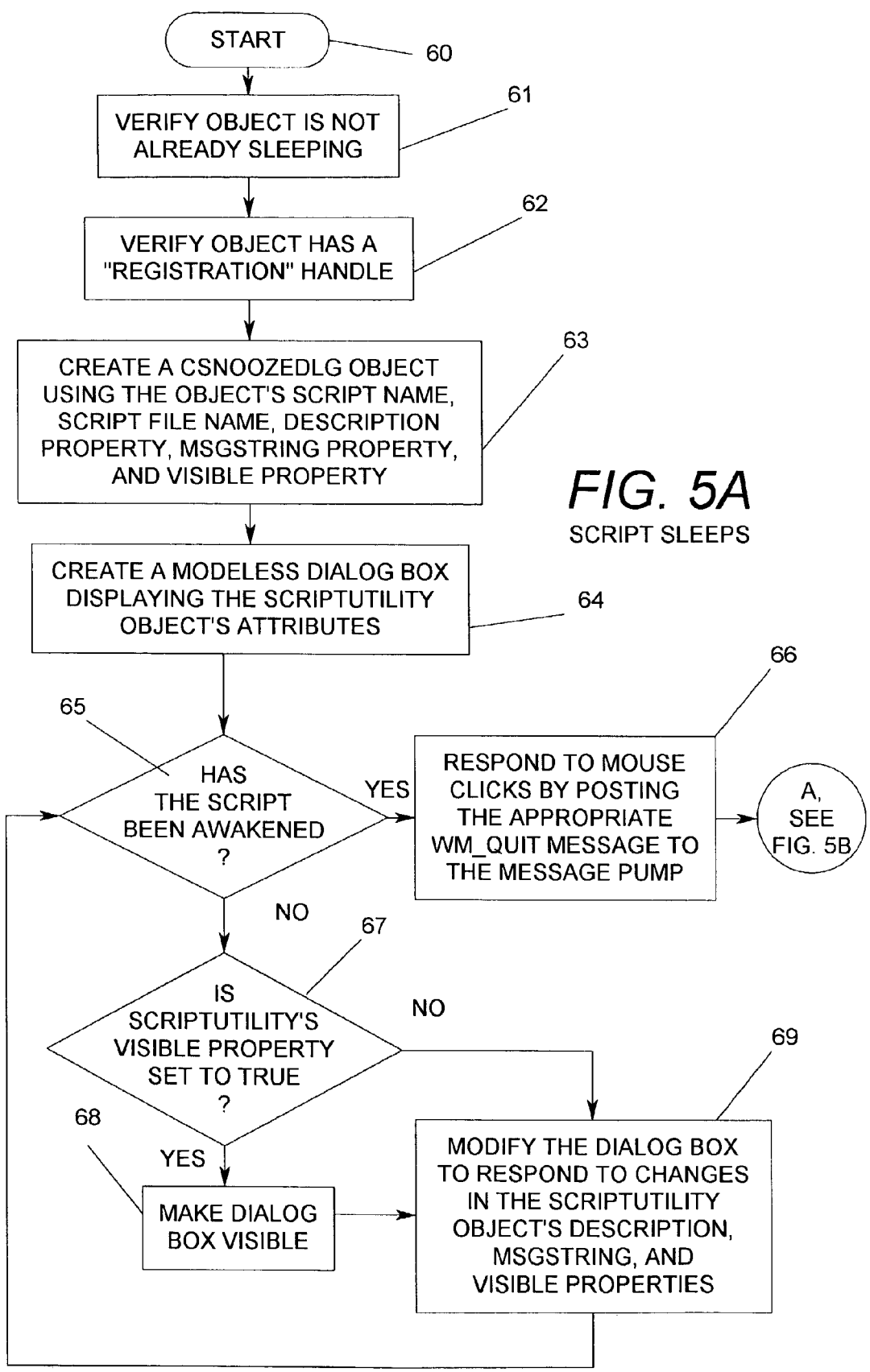
FIGS. 5A and 5B combined form a flowchart that illustrates the high-level process for putting a script to sleep and the choices for making a Dialog Box visible.
Figure 5B:
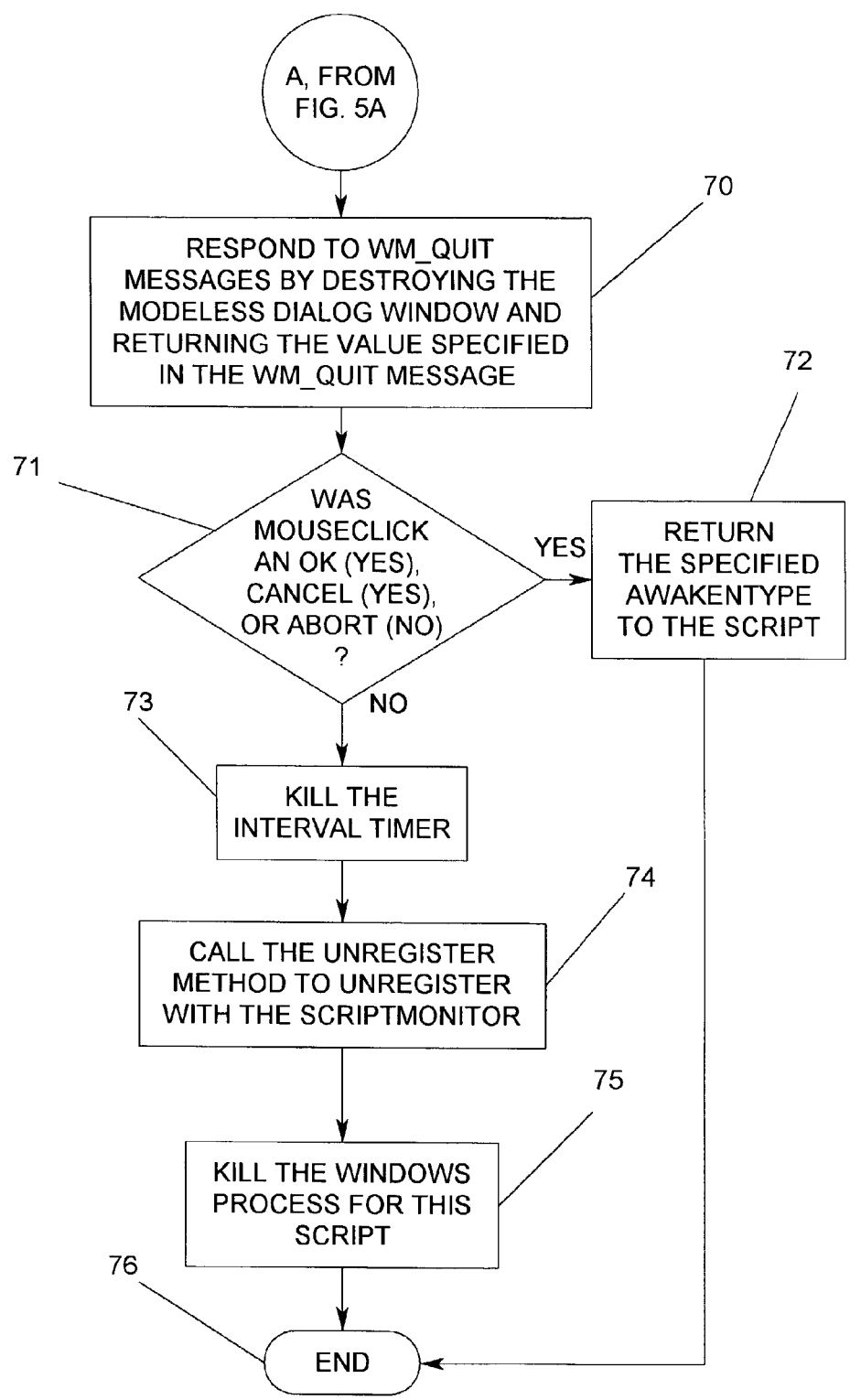

FIG. 5 is a flowchart detailing the high-level steps for setting a selected script to sleep. FIG. 5 is comprised of FIGS. 5A and 5B.

With reference to FIG. 5A, a flowchart describing the high-level process "Script Sleeps" is shown. The Script Sleeps process begins with start bubble 60 followed by a process step that verifies the particular ScriptUtility object is not already sleeping (block 61). This is followed by another process that verifies the ScriptUtility object has a "Registration" handle (block 62). The Registration Handle is a unique identifier generated by the ScriptMonitor service for each individual script registered within. This is followed by another process that creates a CSNOOZEDLG object using the object's script name, script file name, description property, msgstring property, and visible property (block 63). The CSNOOZEDLG object is used to create a dialog box that can be displayed by a sleeping script. Another process is then followed which creates a modeless dialog box displaying the ScriptUtility object's attributes (block 64). This is followed by an inquiry to see whether or not the script has been awakened (Diamond 65). If the answer to the inquiry is yes, the process continues with another step to respond to mouse clicks by posting the appropriate WM_Quit message to the message pump (block 66), which then proceeds to FIG. 5B via reference A.

If the answer to this inquiry of (step 65) is no, another inquiry is made as to whether or not the ScriptUtility's visible property is set to true (Diamond 67). If the answer to this inquiry is no, it is followed by a process to modify the dialog box to respond to changes in the ScriptUtility object's description, msgstring, and visible properties (block 69), which then loops back to inquire whether the script has been awakened (Diamond 65), and continues through the process of steps 65 to 69.

If the answer to the inquiry of (step 67) is yes, a process is invoked which makes the modeless dialog box visible (block 68), which then proceeds to modify the dialog box to respond to changes in the ScriptUtility object's description, msgstring, and visible properties (block 69). This then loops back to see if the script has been awakened (diamond 65), which continues to go through the previous process steps. Thus when the ScriptUtility object is awakened, it proceeds with its work, or if not awake, it can alter the content and visibility of the dialog box.

Now referring to FIG. 5B, which illustrates the high-level process for "Script Sleeps". This begins with a process (step 70) to respond to WM_QUIT messages by destroying the modeless dialog window and returning the value specified in the WM_QUIT message (block 70). This is followed by an inquiry to check the awaken type delivered via mouse click. An awaken type is one of three options: "OK", "Cancel", or "Abort". An awaken type of "OK" indicates that the script is to resume execution when the awaken method is called. The script can take a specific action based on receiving the "OK" value. An awaken type of "Cancel" also indicates that the script is to resume execution when the awaken method is called. The script can take a specific action based on receiving the "Cancel" value. An awaken type of "Abort" indicates that the script is to terminate immediately when the awaken method is called. Because processing stops abruptly in this case, the script might not terminate cleanly. If the answer to the inquiry at step 71 is yes (OK or Cancel), the process returns the specified awaken type to the script (block 72), and then proceeds to exit the process (bubble 76). If the answer to the inquiry at step 71 is no (Abort), a process to kill the interval timer is initiated (block 73). This is followed by a process block (block 74) to call the Unregister method to unregister the script with the ScriptMonitor. Another process is then continued which kills the windows process for the script involved here (block 75). The process then exits (bubble 76). The result now is the ability to kill the interval timer, destroy the dialog window, and either return the awaken type to the script or "unregister" the script with the ScriptMonitor and terminate it.

Now referring to FIG. 6, which illustrates the process of "unregister scripts". This process begins with start bubble 80, which is then followed by a process block (block 81), which verifies that this script was already registered through this ScriptUtility object. This is followed by another step (82) in which the ScriptMonitor searches the linked list of scriptdata objects looking for a match with the PID and "Registration" handle (block 82). This involves an inquiry as to whether or not there is a match with the PID and Registration Handle (Diamond 83).

If the answer to this inquiry (at step 83) is yes, a process to remove the scriptdata object from the linked list is initiated (block 84), which is then followed by another step 85 in which ScriptMonitor releases its reference to the ISCRIPTPOKE interface (block 85), which again is followed by another process to delete the scriptdata object (block 86). This step is then followed by another process block (block 87) working to release the ScriptUtility object's reference to the ISCRIPTREGISTER interface. After step 87, the process is followed to zero out the "Registration" handle (block 88), which then initiates another process block (block 89) in which the ScriptUtility releases reference to the ISCRIPTPOKE interface. Then the process to clear the ScriptUtility object's description property is followed (block 90) to completion. The process then exits (bubble 91).

If the answer to the inquiry at step 83 is no, then step 87 occurs to release the ScriptUtility object's reference to the ISCRIPTREGISTER interface (block 87). In the case of the "no" exit from step 83, the ScriptUtility object has an outdated entry for a PID that is no longer running (for instance, a user terminated the process outside of the script), so the ScriptUtility object's references must be cleaned-up. These are the same steps that take place when there is a match, in which case the ScriptMonitor's copy of the data is cleaned-up first. Notice that steps 84–86 refer to the Script-MONITOR object and steps 87–90 refer to the ScriptUTIL-ITY object. This process is followed at step 88 to zero the "Registration" handle (block 88), which then initiates another process block (block 89) in which the ScriptUtility releases its reference to the ISCRIPTPOKE interface. At step 90, a process to clear the ScriptUtility object's description property by replacing it with an empty string, is followed (block 90). The process then exits (bubble 91).

Described herein has been a specialized method for managing the running of scripts that can support the utilization of applications being run. Here, a Script Utility object is created whereby a series of scripts can be registered. Registered scripts can be paused in their main flow of execution to await an external signal to proceed. Means are provided for setting time intervals which, when expired, allow a selected script to supplement a running application, even if that script has been rendered inactive and put to sleep. A Script Monitor service in the ScriptUtility object enables the management and monitoring of the scripts that are registered. The method also enables a selected script to be awakened or to unregister a registered script. Thus the user of an application will have certain script routines triggered automatically at preset intervals in order to enhance operations of the application being executed.

While a preferred embodiment of the invention has been described, other variations and embodiments may be developed which still fall within the scope of the invention as defined in the following claims.

What is claimed is:

1. In a computer system, a method for simplifying the registering and managing scripts which support a Component object Model (COM) interface and utilize a ScriptUtility object which includes a COM object that supports the actions of Sleep, Awaken, Register, Internal Setting, and Visibility properties, said method comprising the steps of:
    (a) creating a ScriptUtility Object;
    (b) Setting an interval property for x seconds, and performing OnInterval processing while repeating said OnInterval process every interval x seconds;
    (c) Registering one or more scripts;
    (d) Putting add script (s) to sleep;
    (e) Awakening a selected script;
    (f) Rendering script to be visible or invisible.

2. A method for helping application operations for insuring high availability, optimum performance, detection of and response to problem by utilisation of a monitoring script function using scripts which support a Component Object Model (COM) interface and which includes a ScriptUtility Object operating with said COM interface to support actions of Sleep, Awaken, Registration, Interval setting and Visibility properties, and further includes a Script Monitor to manage scripts registered therein by said ScriptUtility Object, said method comprising the steps of:

(a) Creating a ScriptUtility Object for registering and managing scripts and which uses said Script Monitor and which include the steps of:
  (a1) verifying that a script is not already registered;
  (a2) determining the script and file name of a running script;
  (a3) creating a connection between said script and said Script Monitor;
  (a4) registering said script in said Script Monitor;
(b) Setting an interval time period to cause a selected script to perform a specified sequence of statements wherein step (b) includes the steps oft
  (b1) checking to see if there is a current time interval;
  (b2) eliminating the said current time interval setting;
  (b3) creating a new time interval for said script;
(c) Awakening and utilizing a selected script when its time interval has expired;
(d) Using said awakened script to enhance operation of said operating application.

3. The method of claim 2 wherein stop (b3) includes the step of:
  (b3a) Specifying an expiration time period for said newly set time interval;
  (b3b) Returning said expiration period to said Script Monitor.

4. The method of claim 2 wherein step (c) includes the steps of:
  (c1) Sensing that said preset interval timer has expired;
  (c2) Invoking the use of the code associated with the script of the expired interval timer.

5. The method of claim 4 wherein step (c2) includes the step of:
  (c2a) Restarting the timer of the expired interval timer for the just-invoked script.

6. The method of claim 2 wherein step (d) further includes the steps of;
  (di) Checking to verify that the Script Utility Object is not sleeping;
  (dii) Verifying that said Object is identified as having been registered;
  (diii) Creating a dialog box, which displays a sleeping script's attributes;
  (div) Checking to see that the selected script has not been awakened;
  (dv) Making the script's attributes visible in a Dialog Box.

7. The method of claim 6 wherein step (div) includes the step of:
  (diva) Determining that the selected script has been awakened;
  (divb) Utilizing a quit message to destroy said Dialog Box.

8. The method of claim 7 where step (divb) includes the step of:
  (divb-1) Using a mouse click of Abort to kill (removal) the interval timer;
  (divb-2) Removing the Windows process for the selected script.

9. The method of claim 8 wherein step (divb-1) includes the step of:
  (divb-1a) Using a mouse click of OK or CANCEL to return the specified awaken value to the script.

10. A computer implemented method for accessing registered scripts which support a Component Object Model (COM) interface to enhance operations of a running application on a server operating on a Master Control Program and which utilizes a Windows platform, and wherein a ScriptUtility Object supports management of scripts, and a ScriptUtility Register program provides a list of registered scripts which enables external control for the life of the script, said method comprising the steps of:
  (a) Preventing the termination or a selected script which includes the steps of:
    (a1) creating a ScriptUtility object, which permits the display of a Message Box on the user's desktop;
    (a2) allowing a user to specify whether said Message Box can be made visible or invisible via a ScriptUtility Sleep routine;
  (b) Keeping a selected script running and remaining responsive to activation when called for which includes the steps of:
    (b1) awakening a selected sleeping script which is recognised by said ScriptMonitor;
    (b2) executing said formerly sleeping script, which has been awakened;
  (c) calling said ScriptUtility Register to register a selected script with a Script Monitor Service;
  (d) performing scripted tasks at regular intervals.

* * * * *